United States Patent
Montgomery

(10) Patent No.: US 7,455,196 B2
(45) Date of Patent: Nov. 25, 2008

(54) SUPPORT APPARATUS FOR A MANUAL GREASE GUN

(76) Inventor: Joe M. Montgomery, 3925 N. Farm Rd. 143, Springfield, MO (US) 65803

( * ) Notice: Subject to any disclaimer, the term of this patent is extended or adjusted under 35 U.S.C. 154(b) by 431 days.

(21) Appl. No.: 11/247,685

(22) Filed: Oct. 11, 2005

(65) Prior Publication Data

US 2007/0090129 A1   Apr. 26, 2007

(51) Int. Cl.
*B67D 5/06* (2006.01)
(52) U.S. Cl. ............... 222/179; 222/186; 222/256; 222/340; 222/386; 222/472
(58) Field of Classification Search ............... 222/179, 222/186, 256, 262, 323–324, 340, 372, 386, 222/472–474; 248/80–84, 309.1, 311.3, 248/313–314
See application file for complete search history.

(56) References Cited

U.S. PATENT DOCUMENTS

| | | | | |
|---|---|---|---|---|
| 1,349,994 A | * | 8/1920 | Wood | 222/179 |
| 1,680,170 A | * | 8/1928 | Pierce | 222/389 |
| 1,750,150 A | * | 3/1930 | Albertine | 222/179 |
| 1,751,323 A | * | 3/1930 | Gray | 222/340 |
| 1,776,095 A | * | 9/1930 | Albertine | 222/165 |
| 1,804,731 A | * | 5/1931 | Albertine | 222/186 |
| 2,465,653 A | | 3/1949 | Leterman | |
| 4,093,170 A | | 6/1978 | Spray | 248/359 |
| 4,254,926 A | | 3/1981 | Reeberg | 248/152 |
| 4,601,412 A | * | 7/1986 | Martin | 222/256 |
| 4,758,131 A | | 7/1988 | Gurney | 417/259 |
| 4,921,073 A | | 5/1990 | Compton | 184/11.2 |
| 5,551,668 A | | 9/1996 | Hung | 254/8 B |
| 7,063,298 B2 | * | 6/2006 | Henry | 248/309.1 |

* cited by examiner

*Primary Examiner*—Frederick C. Nicolas
(74) *Attorney, Agent, or Firm*—Jonathan A. Bay

(57) ABSTRACT

A support for manual grease guns has a base and lever-restoring mechanism. Grease guns conventionally have a pumping head with a barrel and lever joined thereto for cycling through pumping and restoring strokes between restored and depressed extremes. The restored extreme has the lever and barrel flared apart. Conversely, since the pumping stroke closes the flare, the depressed extreme has the lever brought alongside the barrel. The base has ground-engaging feet as well as clamps for clamping the grease gun tightly by the barrel, preferably with the lever projecting away for pedal-style depression in a generally vertical plane by a user stepping on it. The lever-restoring mechanism links the lever to the base, and yields under the user's step while the lever moves through pumping strokes, but restores the lever toward the restored extreme therefor as soon as the user takes his or her step off the lever.

20 Claims, 3 Drawing Sheets

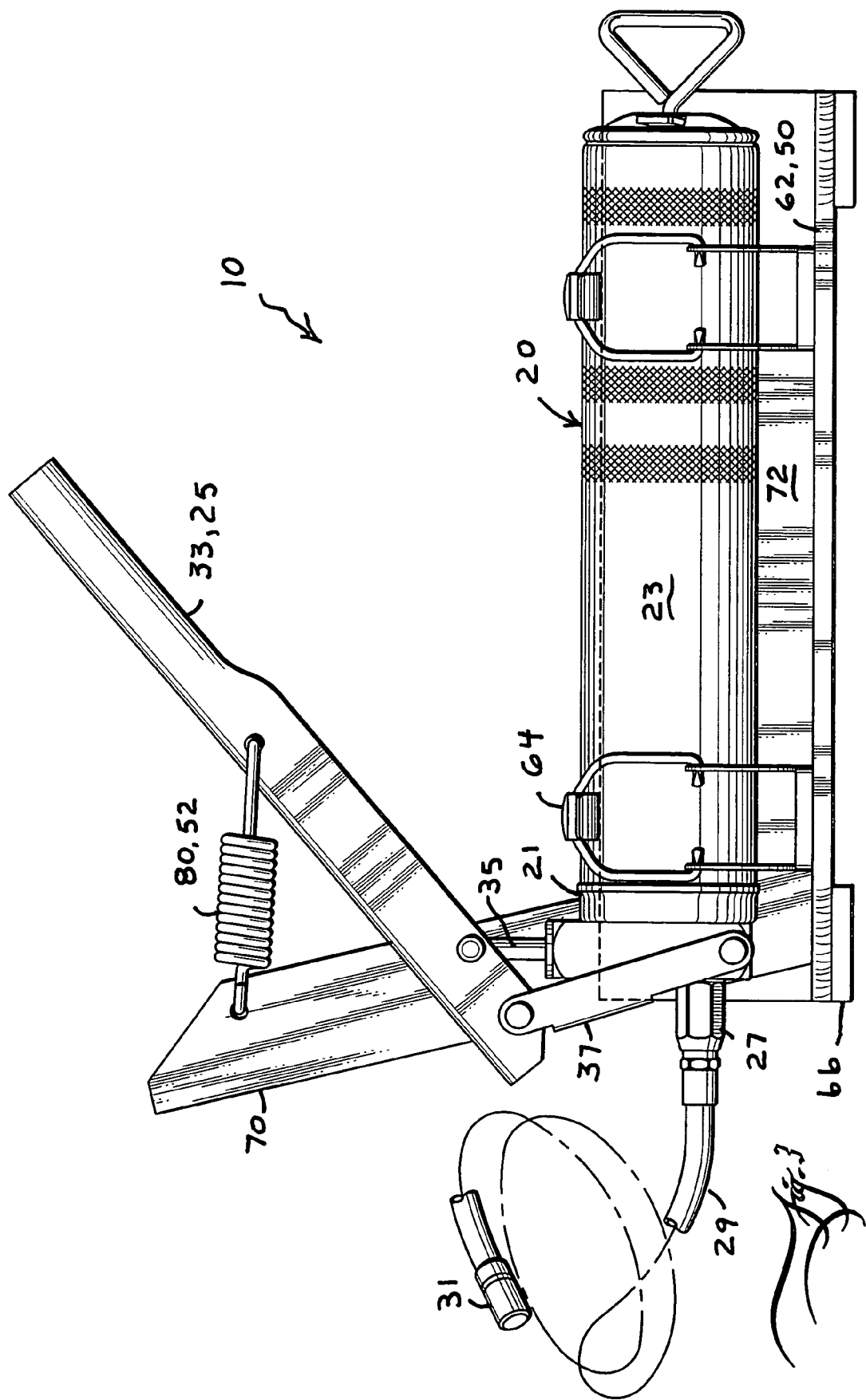

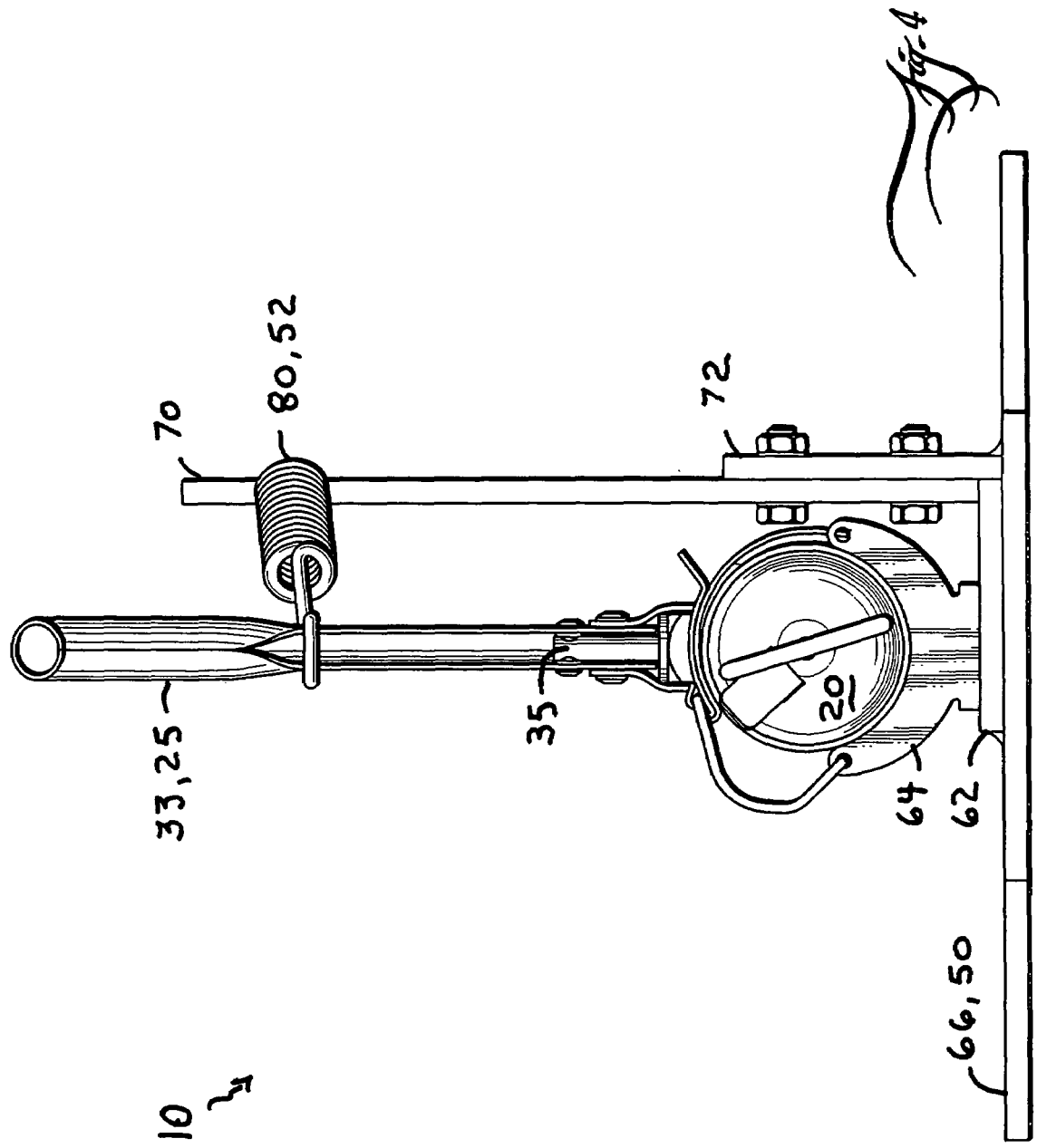

SUPPORT APPARATUS FOR A MANUAL GREASE GUN

BACKGROUND AND SUMMARY OF THE INVENTION

The invention generally relates to supports and, more particularly, to a stand for supporting a manual grease gun that normally takes two hands to cycle through pumping and restoring strokes between flared and depressed extremes respectively, in a way which inventively affords a standing user opportunity to pump by foot.

It is an object of the invention to provide standing users with a support apparatus for a manual grease gun which inventively affords a standing user opportunity to pump the grease gun by foot.

It is another object of the invention to provide the above support apparatus with an automatic lever-restoring mechanism which urges the lever back to the restored extreme after being released by the user's foot.

It is alternate object of the invention to configure the above support apparatus to have a low center of gravity, and hold the grease gun's barrel close to the ground, so that the support stand can be dragged around along the ground by users to various work stations simply by tugging on the grease delivery hose attached to the grease gun's pump head.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 3 is an enlarged side elevational view of FIG. 1, and further depicting an elongated, flexible, grease delivery hose (with portions broken away) that is attached to the grease gun's pump head by a discharge fitting thereof; and FIG. 4 is a rear elevational view of FIG. 3.

DETAILED DESCRIPTION OF THE PREFERRED EMBODIMENTS

Figure 1:
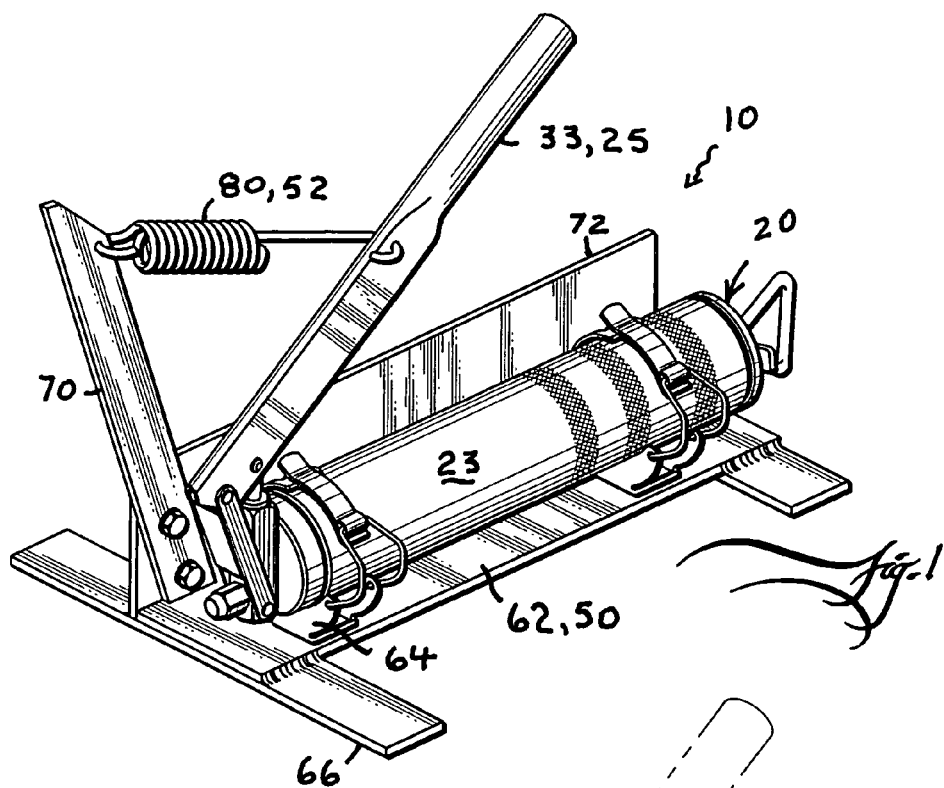
FIG. 1 is a perspective view of a support apparatus in accordance with the invention for a manual grease gun, wherein a grease gun is shown to show operative use environment.
Figure 2:
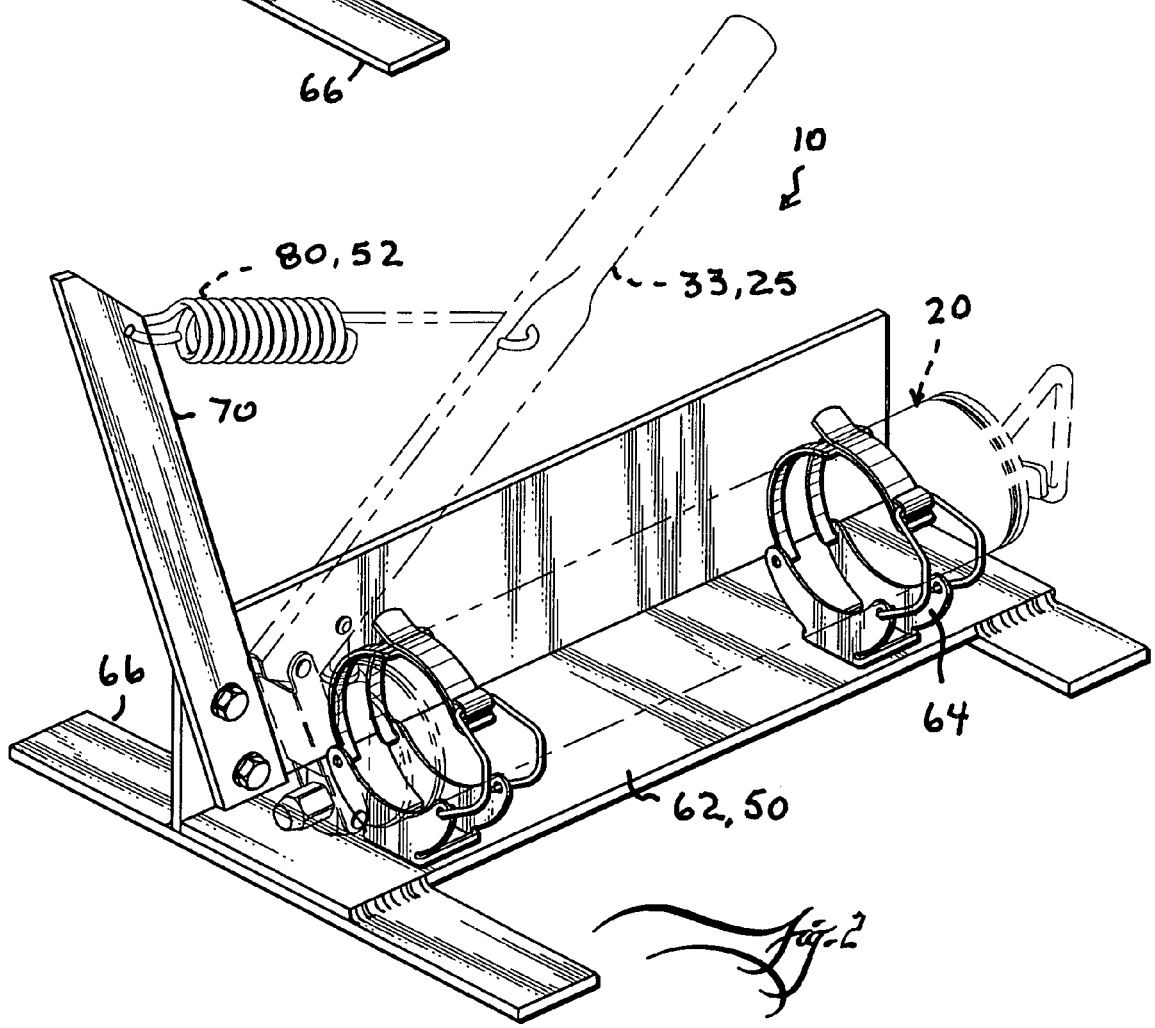
FIG. 2 is an enlarged perspective view comparable to FIG. 1 except depicting the grease gun, as well as a spring of a lever-restoring mechanism in accordance with the invention, in broken lines.

The drawings show a support apparatus 10 in accordance with the invention for a manual grease gun 20. Briefly, this grease gun 20 is representative of a conventional type having a pump head 21 fixed to a barrel 23 and the supporting a toggle pumping-mechanism 25 which achieves discharge of grease from a supply cannister inside the barrel (not in view) through a discharge fitting 27 attached to the pump head 21 and then optionally, if not to a rigid spout (none shown), then through a flexible grease delivery hose 29 as is shown in FIG. 3, and then ultimately out a terminal grease fitting 31.

The toggle pumping-mechanism 25 includes a lever 33. It acts as a handle for users to give their pumping strokes to. The lever 33 also amplifies the manual-supplied input force that users give to the lever 33 by an increase factor of several times as that input force is transmitted to a plunger 35. The lever 33 is pivoted to the end of the plunger 35 as FIG. 3 shows best, and it can be reckoned that the lever 33 is partitioned into sort of an elongated handle end opposite a short rocking end. The lever 33's short rocking end is pivoted to one end of a link 37 which at its opposite end is pivoted to the pump head 21.

In use, pumping this type of grease gun 20 to date has conventionally been practiced with two hands, one grasping the barrel 23, the other grasping the lever 33. The lever 33 is manually cycled through pumping and restoring strokes between extreme positions of fully flared (ie., as shown by all the drawings) and fully depressed (not shown, but the finish of the pumping stroke closes or collapses the flare between the lever 33 and barrel 23, which results with the two being brought alongside one another).

Hence, depressing the lever 33 from the flared position to the depressed position comprises the pumping stroke, and grease is thereby discharged. If let to rest there, the lever 33 does not restore itself on its own toward the fully restored (or flared position). To do that requires manual work too. However, the restoring stroke produces no discharge of grease. It merely restores the lever 33 for a succeeding pumping stroke. And so on, wherein manual pumping strokes alternate with manual restoring strokes.

In view of that introduction to grease guns 20, a support apparatus 10 in accordance with the invention comprises a base 50 and lever-restoring mechanism 52. The base 50 comprises an axially-elongated mounting plate 62 (eg., axial relative the axis of the grease gun 20's barrel 23), a pair of clamp provisions 64 affixed to the mounting plate 62 for clamping the grease gun 20 by the barrel 23 thereof tightly to the base 50, and a pair of laterally spread feet 66 at the axial ends of the mounting plate 62 to give the support apparatus 20, among other things, stability against tipping over easily.

Each clamp provision 64 comprise a lower saddle portion equipped with cam-buckled bands for completing a clamping encirclement around the barrel 23 and allowing snap-action style connection and disconnection for readily affixing and unfixing the grease gun 20 to the base 50.

The lever-restoring mechanism 52 comprises a spar or tower 70 buttressed by a flange 72 and a tension spring 80 that has hook ends for hooking in hook-retention formations formed in the tower 70 and lever 33 respectively. Various inventive advantages are achieved by the foregoing.

The base 50 and clamp provisions 64 thereof are especially adapted to secure the grease gun 20's barrel 23 close to the ground, generally along a horizontal axis, with the lever 33 thereof projecting away for pedal-style depression in a generally vertical plane by a standing user's foot. Needless to say, with the barrel 23 held still, stepping down on the lever 33 achieves a pumping stroke. And with that going on, the lever-restoring mechanism 52 operates to do all of the following, namely:

it perpetually urges the lever 33 toward the lever 33's extreme restored position (or, ie., extreme flared position, and as shown in all the drawings), and this work is done by the constant pull of the tension spring 80 from its stationary anchorage in the tower 70, it yields to the application of force to the lever 33 for pumping strokes (and the consequent movement of the lever 33 toward the depressed extreme, not shown) by way of the tension spring 80 stretching longer, which as an aside the tension spring stores the energy required to stretch it as a potential reserve, and after release of the applied force, it expends the energy stored in the stretched tension spring 80 to urge (pull) and restore the lever 33 back toward the restored extreme therefor (and again, this is the position for the lever 33 shown in all the drawings).

Although one particular construction of a lever-restoring mechanism 52 is illustrated for convenience sake (and it being illustrated utilizing a tension spring 80), persons ordinarily skilled in the art would readily recognize that there are numerous outer equivalent structures to substitute therefor and accomplish the same or comparable work, including without limitation arranging compression or torsion springs to assist in the work of restoring the lever 33.

It is preferred to situate the grease gun 20 generally low to the ground, with the barrel 23's axis generally horizontal, and the lever 33 flaring out away for pedal-style depression in a generally vertical plane. That way, the base 50 with its substantial foot-print on its ground better opposes movement of the barrel 33 during a user's downward step on the lever 33 for pumping strokes, and without the base 50 having to be fastened or staked to the ground. All that is required is that the ground not be truly slick but afford some minimal measure of frictional gripping. As an aside, the term "ground" is used here for non-limiting convenience in this written description only and may encompass without limitation such concepts as floor, step, bench or tool cart and so on.

Moreover, without the base 50 having to be fastened or staked to the ground, the support apparatus 10 and affixed grease gun 20 as a hole can be simply dragged around a workshop like a sled on the floor by users tugging it along by the grease delivery hose 29 thereof, which is connected to the grease gun 20's pump head 21.

It is another preference of the invention that the spar or tower 70 be kept abbreviated in height (eg., relatively low or short) in order to be kept out of the way of a user's lifted foot who is attempting to step on the lever 33. To the same end, the tension spring 80 is shown linked to the top of the tower 70 to get the maximum benefit of the tower 70's height.

Conversely, the tension spring 80 is linked only midway to the elongated handle span of the lever 33. The abbreviated tower 70 and low attachment point for the tension spring 80 on the lever 33 both help avoid tripping users or else being kicked when users lift a foot to step on the lever. Moreover, the low attachment point for the tension spring 80 on the lever 33 also affords some unobstructed treadle space at the end of the lever 33.

As FIG. 3 better shows, the tower 70 is positioned about even with or a little ahead of the grease gun 20's pump head 21. Indeed, it is preferred to tilt the tower 70 forward as shown. That way, the tower 70 may be constructed out of a slenderer piece of stock material and sufficiently resist deflection or deformation when the attached tension spring 80 is stretched to the fullest extent at the completion of the pumping stroke. It should be appreciated that when the tension string 80 is stretched to the fullest extent at the completion of the pumping stroke, it will not extend back along the 3 o'clock axis as shown but more likely back along the 5 o'clock axis (not shown). As a result, with the tower 70 being tilted forward along an 11 o'clock axis, the tower 70 will be carrying the tension of the stretched spring 80 as lines of compression along its long axis, rather than undesirably as lines of bending if the stretched spring 80 were connected at a right angle connection (which it is not, at least when stretched).

Nowadays, without any special preference besides the inventor's long familiarity with it, the preferred stock material for fabricating the plate portions of the inventive support stand 10 is aluminum. The preferential reasons for aluminum include that aluminum is easily fabricated, welded or fastened and is also corrosion resistant. However, workers ordinarily skilled in art would appreciate that there are numerous suitable substitutes to achieve the same or comparable ends.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A combination of a manual grease gun with a support apparatus providing said manual grease gun with a pedal-mode of operation, said combination comprising:

said manual grease gun, having a pumping head and a barrel and lever joined to the pumping head for cycling through pumping and restoring strokes between pumped and restored extremes wherein the restored extreme has the lever and barrel flared apart and the pumping stroke closes the flared and brings the lever and barrel alongside one another, wherein said manual grease gun is operative in a manual-mode of operation by a user who can carry the manual grease gun aloft and with two hands can cycle the barrel and lever through the pumping and restoring strokes; and said support apparatus, comprising:

a base having a ground-engaging portion as well as a fixture portion that secures the grease gun's barrel close to ground with the lever thereof projecting away for pedal-style depression in a vertical plane by a foot of the user for said pumping stroke; and a lever-restoring mechanism secured to the base and releasably linked to the lever, yielding to applied force while the lever moves through said pumping stroke, and restoring the lever toward the restored extreme after release of the applied force, wherein said manual grease gun is operative in said pedal-mode of operation whereby said user pumps the lever by the foot;

said fixture portion comprising a releasable clamping arrangement that clamps around the grease gun's barrel wherein the user alternately secures the manual grease gun to the base and lever-restoring mechanism for utilization in the pedal-mode of operation, or release the manual grease gun from the base and lever-restoring mechanism for utilization in the manual-mode of operation whereby the manual grease gun including the pumping head, barrel and lever thereof afford the user opportunity to carry aloft without the support apparatus and cycle the barrel and lever with the two hands through the pumping and restoring strokes.

2. The combination of claim 1 wherein:

the fixture portion of the base is further adapted to situate the grease gun's barrel along a horizontal axis; and the ground-engaging portion extends axially and laterally to provide a substantial foot-print on the ground such that the ground and base cooperatively oppose movement of the barrel during said pumping stroke.

3. The combination of claim 2 wherein:

said releasable clamping arrangement of the fixture portion comprises a set of saddles, each having cam-buckled bands for completing a clamping encirclement around the barrel and allowing snap-action connection and disconnection for fixing and unfixing the grease gun respectively.

4. The combination of claim 1 wherein:

said lever-restoring mechanism includes a spring operative to yield to the applied force during said pumping stroke by storing energy and then, after release of the applied force, expending the stored energy to pull, push or torsionally restore the lever toward the restored extreme, whereby the applied force must be sufficient to both move the lever through said pumping stroke and make the spring yield.

5. The combination of claim 4 wherein:

said lever-restoring mechanism comprises a tension spring and a tower that is secured to the base and situated at least in part forward of or even with the grease gun's pump head in order to be out of the way of the foot of the user when attempting to step on the lever, said tension spring having one end linked to the tower and another end adapted for linking to the lever.

6. The combination of claim 5 wherein:

said tension spring extending elongated between one and another ends that are hooks adapted for hook-retention provisions in the tower and lever.

7. The combination of claim 1 wherein:

the ground-engaging portion comprises a web extending axially and laterally to provide a substantial foot-print on the ground for stability and such that said support apparatus and affixed the grease gun can be dragged along the ground from place to place by a grease delivery hose connected to the pump head.

8. A support apparatus for a manual grease gun having a pumping head and barrel and lever joined to the pumping head for cycling through pumping and restoring strokes between pumped and restored extremes wherein the restored extreme has the lever and barrel flared apart and the pumping stroke closes the flared and brings the lever and barrel alongside one another, and wherein said manual grease gun is operative in a manual-mode of operation such that a use can carry the manual grease gun aloft and cycle the barrel and lever with two hands through the pumping and restoring strokes; said support apparatus comprising:

a base having a ground-engaging portion and a releasable barrel holder holding the grease gun's barrel tight to the base, close to ground, and without obstructively interfering with cycling the lever thereof through the pumping and restoring strokes between flared and depressed extremes respectively; and a lever-restoring mechanism secured to the base and releasably linked to the lever for urging the lever toward the flared extreme, yielding to the lever's movement toward the depressed extreme through said pumping stroke by a standing user applying an applied force to the lever with a lower extremity including a foot, and restoring the lever toward the flared extreme after release of the applied force, wherein said manual grease gun is operative in a pedal-mode of operation whereby the user pumps the lever by lower extremity including by the foot;

wherein the ground-engaging portion engages the ground to stabilize the base and oppose movement of the grease gun's barrel during the pedal-mode of operation against application of the applied force to and movement with the lever for said pumping stroke; and wherein said releasable barrel holder comprises a manually releasable mechanism such that the user alternately secures the manual grease gun to the base and lever-restoring mechanism for utilization in the pedal-mode of operation, or release the manual grease gun from the base and lever-restoring mechanism for utilization in the manual-mode of operation whereby the manual grease gun including the pumping head, barrel and lever thereof afford the user opportunity to carry aloft without the support apparatus and cycle the barrel and lever with the two hands through the pumping and restoring strokes.

9. The support apparatus of claim 8 wherein:

the base is further adapted to hold the grease gun's barrel along a horizontal axis and orient the lever, when urged toward the flared extreme, to project up and out for pedal-style depression in a vertical plane.

10. The support apparatus of claim 9 wherein:

the ground-engaging portion extends axially and laterally to provide a substantial foot-print on the ground and frictionally engage the ground over a spread area for better opposing movement of the barrel during said pumping stroke.

11. The support apparatus of claim 10 wherein:

the ground-engaging portion comprises a pad such that said support apparatus and affixed grease gun can be dragged along the ground from place to place by a grease delivery hose connected to the pump head.

12. The support apparatus of claim 8 wherein:

said manually releasable mechanism comprises at least one cam-buckled band for completing a clamping encirclement around the barrel and allowing snap-action connection and disconnection for fixing and unfixing the grease gun respectively.

13. The support apparatus of claim 8 wherein:

said lever-restoring mechanism includes a spring operative to yield to the applied force during said pumping stroke by storing energy and then, after release of the applied force, expending the energy to pull, push or torsionally restore the lever toward the restored extreme, whereby the applied force must be sufficient to both move the lever through said pumping stroke and make the spring yield; and said lever-restoring mechanism comprises a tension spring and a tower that is secured to the base and situated at least in part forward of or even with the grease gun's pump head in order to be out of the way of the foot of the user when attempting to step on the lever, said tension spring having one end linked to the tower and another end adapted for linking to the lever.

14. A support apparatus for a manual grease gun having a barrel and a lever, comprising:

a base including a holder for holding the grease gun, excluding the lever thereof, stationary to the base and in an orientation not only with the grease gun's barrel extending along a horizontal axis as well as with the lever, when urged toward a flared extreme, projecting up and out for depression in a vertical plane but also without the holder obstructively interfering with cycling the lever through pumping and restoring strokes between the flared extreme and a depressed extreme respectively; and a lever-restoring mechanism secured to the base and releasably linked to the lever for urging the lever toward the flared extreme, yielding to movement of the lever toward the depressed extreme by a foot-applied applied force thereto for said pumping stroke, and restoring the lever toward the flared extreme after release of the applied force;

wherein said holder includes a releasable mechanism such that a user alternately secures the manual grease gun to the base and lever-restoring mechanism for pumping the lever by the foot, or release the manual grease gun from the base and lever-restoring mechanism such that the manual grease gun including the pumping head, barrel and lever thereof are free of the support apparatus and thus allow the user to carry the grease gun aloft and cycle the barrel and lever with two hands through the pumping and restoring strokes.

15. The support apparatus of claim 14 wherein:
said lever-restoring mechanism includes a spring operative to yield to the applied force during said pumping stroke by storing energy and then, after release of the applied force, expending the energy to pull, push or torsionally restore and urge the lever toward the restored extreme, whereby the applied force must be sufficient to both move the lever through said pumping stroke and make the spring yield.

16. The support apparatus of claim 15 wherein:
said lever-restoring mechanism comprises linking structure held fixed by the base and a tension spring having one end linked to said linking structure and another end adapted for linking to the lever, and thereby expending the energy to pull the lever toward the restored extreme.

17. The support apparatus of claim 16 wherein:
said tension spring extending elongated between one and another ends that are hooks adapted for hook-retention provisions in the linking structure and lever.

18. The support apparatus of claim 14 wherein:
said base includes one or more ground-engaging pads and the holder holds the grease gun close to the ground for anti-tipping stability such that said support apparatus and held grease gun can be dragged along the ground from place to place by a grease delivery hose connected to the grease gun's pump head.

19. The support apparatus of claim 14 wherein:
the base extends axially and laterally to provide stability on a base-support surface over a spread area for better providing unassisted opposition to movement of the barrel during said pumping stroke.

20. The support apparatus of claim 14 wherein:
said releasable mechanism of said holder comprises a set of cam-buckled bands for completing a clamping encirclement around the barrel and allowing snap-action connection and disconnection for fixing and unfixing the grease gun respectively.

* * * * *